Aug. 26, 1924.

W. A. CALDWELL

INNER TUBE FOR PNEUMATIC TIRES

Filed July 28, 1921

1,506,161

WITNESSES

INVENTOR
W. A. Caldwell,
BY
ATTORNEYS

Patented Aug. 26, 1924.

1,506,161

UNITED STATES PATENT OFFICE.

WILLIAM ADDISON CALDWELL, OF MANILA, PHILIPPINE ISLANDS.

INNER TUBE FOR PNEUMATIC TIRES.

Application filed July 28, 1921. Serial No. 488,115.

*To all whom it may concern:*

Be it known that I, WILLIAM A. CALDWELL, a citizen of the United States, and a resident of Manila, Philippine Islands, have made certain new and useful Improvements in Inner Tubes for Pneumatic Tires, of which the following is a specification.

This invention relates to an inner tube for pneumatic tires.

It is well known that inner tubes are often punctured and causing the tire casing to be deflated, and necessitating the inner tube to be repaired or new tube substituted before the same can be again inflated. This causes in many instances an undesirable delay and especially so in case the automobile, motor cycle or other vehicle with which the pneumatic tire is associated is being used for transportation purposes at the time when the puncture occurs.

It is an object of the present invention to overcome the above objectionable features by providing two inner tubes, one of which is disposed entirely within the other, and so arranged that the outer tube may be initially inflated for carrying the load imposed upon the tire casing, while the inner tube may remain inactive and only be fully inflated and brought into use when the outer tube becomes punctured, thus making it possible to always hold in reserve an inner tube for each tire casing.

Other objects will hereinafter appear.

The invention is illustrated by way of example in the accompanying drawings, in which:—

Figure 1:
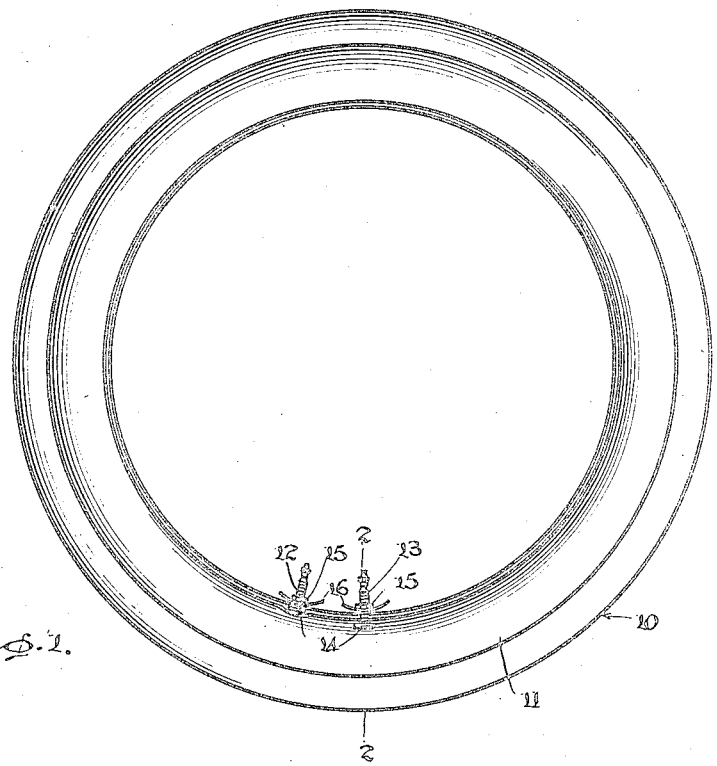
Figure 1 is a central section of a pair of inner tubes when assembled together in accordance with my invention and the outer tube fully inflated.
Figure 2:
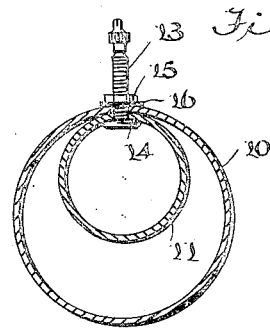
Figure 2 is a transverse section thereof taken substantially on the line 2—2 of Figure 1, and showing the outer tube fully inflated and the inner tube partially inflated.

Referring to the drawings more particularly, 10 indicates generally the outer tube and 11 the inner tube. The inner tube and outer tube each having a separate air valve as indicated at 12 and 13, respectively, the stem of each air valve being threaded as shown, and having a head 14 formed at its inner end. Each valve stem carries a nut 15 and interposed between each nut and the outer tube 10 is an arcuate shaped washer 19. As is apparent by the use of the nut 15 the tubes are sealed against leakage at the points where the valve passes therethrough.

In the use of the present invention the two tubes are positioned within the tire casing in the usual manner, and provision made in the tire rim so that the two air valves 16 and 17 may extend therethrough. The outer tube 10 is fully inflated, while the inner tube 11 is only partially inflated. The outer tube then will support the load imposed upon the tire casing, while the inner tube will remain inactive.

Figure 3:
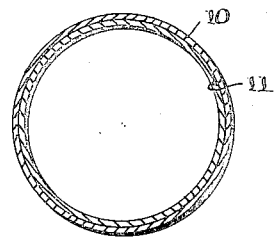
Figure 3 is a transverse section similar to the view shown in Figure 2 but taken at a time when the inner tube is fully inflated.
Figure 4:
Figure 4 is a similar transverse section taken when neither of the tubes are inflated.

The object of partially inflating the inner tube is mainly for the purpose of extending its life, but in this condition it will to some extent have an additional cushioning effect. In case the outer tube 10 becomes punctured then it is only necessary to pump air through the valve 15 and fully inflate the inner tube 11 as shown in Figure 3, which can be done without any great loss of time, and also without removing the outer tube 10.

I claim:—

In combination with a pneumatic tire casing, a pair of inner tubes, the innermost one of which is normally of less size than the outermost one and disposed within said outer tube and adapted to be partially inflated initially and remain in that condition until puncture of the outer tube, an inflation stem extending transversely through both of said tubes at their inner circumferential center, and communicating at its inner end with the innermost tube, means carried on said stem and adapted to be forced against the outer face of the outer tube whereby the pair of tubes are clamped together and the stem openings therein sealed, a second inflation stem communicating at its inner end with the outer tube only, and disposed in the same circumferential center plane as the first named inflation stem, and means carried on said second inflation stem whereby to seal the stem opening of the outer tube.

WILLIAM ADDISON CALDWELL.